US011291911B2

(12) United States Patent
Saville et al.

(10) Patent No.: US 11,291,911 B2
(45) Date of Patent: Apr. 5, 2022

(54) VISUALIZATION OF SOUND DATA EXTENDING FUNCTIONALITY OF APPLICATIONS/SERVICES INCLUDING GAMING APPLICATIONS/SERVICES

(71) Applicant: Microsoft Technology Licensing, LLC, Redmond, WA (US)

(72) Inventors: Matthew Todd Saville, Bellevue, WA (US); John Wesley Forester McPherson, Kirkland, WA (US); Vivian Liao, Bellevue, WA (US); Takahisa Sakurai, Redmond, WA (US); Catherine Michelle Billings, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 49 days.

(21) Appl. No.: 16/685,468

(22) Filed: Nov. 15, 2019

(65) Prior Publication Data
US 2021/0146237 A1 May 20, 2021

(51) Int. Cl.
*A63F 13/25* (2014.01)
*G06F 3/0484* (2013.01)
(Continued)

(52) U.S. Cl.
CPC ............ *A63F 13/25* (2014.09); *G06F 3/0484* (2013.01); *G10L 21/10* (2013.01); *G10L 25/51* (2013.01)

(58) Field of Classification Search
CPC ....... A63F 13/25; G06F 3/0484; G10L 21/10; G10L 25/51
See application file for complete search history.

(56) References Cited

U.S. PATENT DOCUMENTS

| 7,689,413 B2 | 3/2010 | Hershey et al. |
| 8,841,535 B2 * | 9/2014 | Collins .................... G06F 3/16 84/615 |

(Continued)

FOREIGN PATENT DOCUMENTS

WO 2019217104 A1 11/2019

OTHER PUBLICATIONS

Collins, et al., "Visualized Sound Effect Icons for Improved Multimedia Accessibility: A Pilot Study", In Journal of Entertainment Computing, vol. 3, Issue 1, Jan. 1, 2012, pp. 11-17.
(Continued)

*Primary Examiner* — Yingchuan Zhang

(57) ABSTRACT

The present disclosure relates to processing operations configured to execute a sound visualization application/service that dynamically generates graphical sound indication providing a visualization of sound for content being presented. A visualization of sound data may be generated and rendered from analysis of sound data, occurring in a manner that is independent from the application/service that is being used to present the content. The sound visualization application/service may be implemented as an independent application/service or plugin that works universally to provide graphical sound visualization regardless of whether content was developed to support graphical sound visualization. For example, a sound visualization application/service is implemented that generates and renders sound indication graphically without requiring access to code of displayed content. Rendered sound visualization may be presented concurrently with displayed content. This differentiates from traditional technical examples that may code accessibility features directly into the content itself, thereby overcoming limitations in previous implementation examples.

20 Claims, 6 Drawing Sheets

(51) Int. Cl.
*G10L 21/10* (2013.01)
*G10L 25/51* (2013.01)

(56) References Cited

U.S. PATENT DOCUMENTS

| | | |
|---|---|---|
| 9,812,152 B2 | 11/2017 | Christian |
| 10,085,108 B2 | 9/2018 | Greff et al. |
| 10,293,260 B1* | 5/2019 | Evans .................... A63F 13/67 |
| 2011/0176790 A1* | 7/2011 | Morris ................. G06F 3/0481 |
| | | 386/299 |
| 2014/0337741 A1* | 11/2014 | Reponen ............ G06F 3/04817 |
| | | 715/728 |
| 2016/0255455 A1 | 9/2016 | Kulavik et al. |
| 2017/0083280 A1 | 3/2017 | Yu et al. |
| 2018/0139257 A1 | 5/2018 | Ninoles et al. |
| 2019/0099673 A1 | 4/2019 | Shao |
| 2019/0126151 A1 | 5/2019 | Li |

OTHER PUBLICATIONS

Jain, et al., "Head-Mounted Display Visualizations to Support Sound Awareness for the Deaf and Hard of Hearing", In Proceedings of the 33rd Annual ACM Conference on Human Factors in Computing Systems, Apr. 18, 2015, 10 Pages.

Maenpaa, Heidi, "Optimizing Video Games for the Hearing Impaired", A Thesis Submitted for the Partial Fulfillment of the Requirements for the Bachelor Degree Programme in Media and Arts of Tampere University of Applied Sciences, May 2014, 61 Pages.

"International Search Report and Written Opinion Issued in PCT Application No. PCT/US20/059241", dated Feb. 17, 2021, 14 Pages.

* cited by examiner

300

320

VISUALIZATION OF SOUND DATA EXTENDING FUNCTIONALITY OF APPLICATIONS/SERVICES INCLUDING GAMING APPLICATIONS/SERVICES

BACKGROUND

Real-time (or near real-time) processing of a variety of applications/services can be improved for users by providing visual indication of sound. Gaming is one non-limiting example of a field in which sound visualization can be utilized to greatly improve an experience for a user, for example, where a user is playing a game with the sound off/muted or a user is hearing-impaired. Unfortunately, many video games are limited with respect to what accessibility features are offered to users (if any at all). In most games, players who are deaf or hard-of-hearing are unable to hear significant sounds such as footsteps, explosions, gunshots, and so on. Further, this may result in a user not being able to pinpoint the direction these sounds are coming from. This lack of auditory awareness puts a user at a huge disadvantage when playing in a gaming session, especially when playing against others during a multiplayer gaming session. As such, gaming applications/services, as well as computing devices executing video games, stand to be greatly improved through innovations that provide enhanced feature generation functionality that may provide graphical sound visualization, among other types of improved features.

Another technical challenge is posed when attempting to integrate sound visualization within video games or other interactive software. This is especially true in scenarios where a video game was initially programmed without such functionality. While it may be possible to update games post-release, this often requires developers to have access to and understanding of the video game code of a specific game. In traditional cases where game developers integrate sound visualization into a video game, the sound visualization is integrated directly in the video game code making the graphical sound indication specific to (and part of) the video game. From a technical standpoint, this is a tedious and time-consuming task that also needs to be uniquely undertaken for each game that is programmed. Another technical drawback of traditional integration of sound visualization directly into video game code is that this does not enable the sound visualization to be applied universally across different video games and/or different types of applications/services.

SUMMARY

In view of the foregoing technical challenges, the present disclosure relates to processing operations configured to execute a sound visualization application/service that dynamically generates graphical sound indication providing a visualization of sound for content being presented. A visualization of sound data may be generated and rendered from analysis of sound data, occurring in a manner that is independent from the application/service that is being used to present the content. The sound visualization application/service may be implemented as an independent application/service or plugin that works universally to provide graphical sound visualization regardless of whether content was developed to support graphical sound visualization or not. For example, a sound visualization application/service is implemented that generates and renders sound indication graphically without requiring access to code of an executing video game (or other type of content). Rendered graphical visualization of sound data may be presented concurrently with displayed content (e.g., a video game). This differentiates from traditional technical examples that may code accessibility features directly into the content itself, thereby overcoming limitations in previous implementation examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
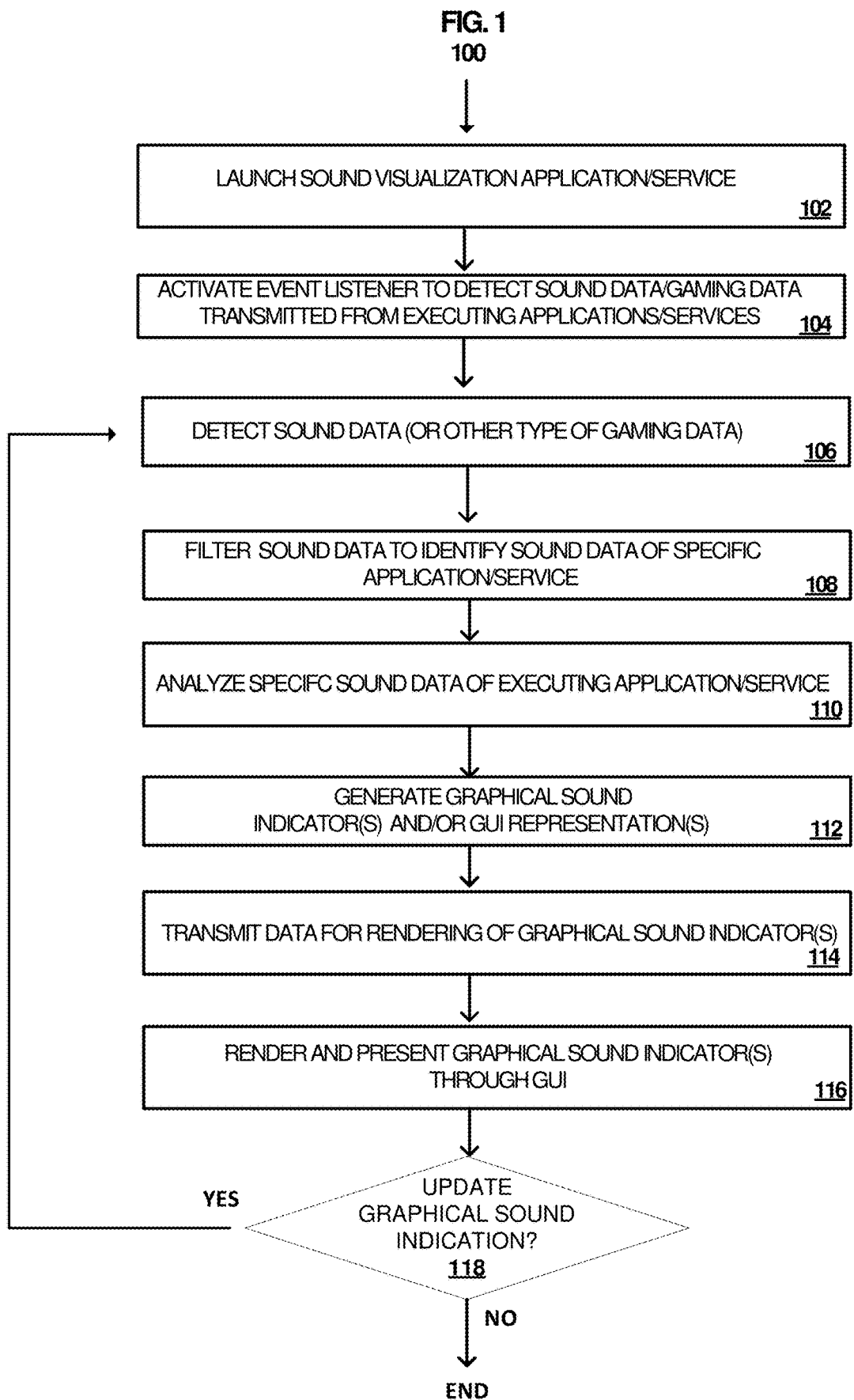
FIG. 1 illustrates an exemplary method related to processing by an exemplary sound visualization application/service as described herein, with which aspects of the present disclosure may be practiced.

As referenced above, present disclosure relates to processing operations configured to execute a sound visualization application/service that dynamically generates graphical sound indication providing a visualization of sound associated with content being presented. A visualization of sound data may be generated and rendered from analysis of sound data, occurring in a manner that is independent from the application/service that is being used to present the content. The sound visualization application/service may be implemented as an independent application/service or plugin that works universally to provide graphical sound visualization regardless of whether content was developed to support graphical sound visualization or not. For example, a sound visualization application/service is implemented that generates and renders sound indication graphically without requiring access to code of an executing video game (or other type of content). Rendered graphical visualization of sound data may be presented concurrently with displayed content (e.g., a video game). This differentiates from traditional technical examples that may code accessibility features directly into the content itself, thereby overcoming limitations in previous implementation examples.

For ease of explanation, a specific type of content is described herein as being a video game executing through a gaming application/service (e.g., a video game application/service). While this is one non-limiting example in which the present disclosure is applicable, it is to be understood that processing operations described herein may be applied to any type of content executing through any type of application/service. For instance, an exemplary sound visualization application/service may be configured to analyze any type of content executing through any type of application/service without departing from the spirit of the present disclosure. While reference is made to generation of graphical sound indication, it is to be understood that exemplary applications/services described herein may be modified and adapted to generate any type of accessibility feature functionality. For instance, other types of accessibility features may be generated and rendered in an independent manner that may be universally applied to execute concurrently with content presentation applications/services. Non-limiting examples of other types of accessibility features that an exemplary application/service may be configured to generate and render comprise but are not limited to accessibility features pertaining to: display and readability; sound and speech; indication of device/touch input (including options/menus/selections); learning disabilities; application/service and/or website accessibility, and among other examples.

In one example, a sound visualization application/service is launched on a device that is executing content of an application/service. For example, the sound visualization application/service is being launched and executed on a computing device that is concurrently executing a video game of a gaming application/service. Non-limiting examples of this type of operation is that in which a user is playing a game on a computer (e.g., PC, laptop, tablet) or other type of computing device such as a mobile computing device. An exemplary sound visualization application/service is configured to execute processing operations that enable generation and rendering of graphical sound indication (e.g., one or more graphical sound indicators) for a video game that is concurrently running on the computing device. One or more components of the sound visualization application/service are configured to detect sound data transmitted by the video game to an audio component of the computing device. For instance, a video game application/service may transmit sound data to an audio component of the computing device for output by the computing device (or another output device connected with the computing device). In one example, detection of the sound data may comprise execution of an event listener that detects the transmission of the sound data from the gaming application/service to the audio component of a computing device (e.g., that is configured for output). As the audio component of the computing device may be a general processing component that receives data from a plurality of applications/services, processing operations may be executed to filter content transmitted by a specific application/service (e.g., gaming application/service) and parse the sound data before the sound data is analyzed.

Continuing the above example, the sound data may be analyzed by the sound visualization application/service. In one non-limiting example, analysis of the sound data comprises executing a determination as to whether the sound data meets a threshold sound level, which may be a trigger for subsequent analysis of the sound data. In any example, analysis of the sound data may identify a location of a sound within the video game, for example, by analyzing raw sound data transmitted by a gaming application/service for output by one or more audio components of a computing device. Furthermore, subsequent analysis may be executed to classify a type of the sound. The sound visualization application/service may utilize said classification to provide enhanced graphical sound indication (e.g., display of an icon indicating the type of sound detected). Results of analysis of the sound data may be utilized to generate a graphical sound indicator of the sound. For instance, the graphical sound indicator comprises a graphical indication for the location of the sound, among other characteristics, based on a result of the analyzing of the sound data. The sound visualization application/service transmits data for rendering of the graphical sound indicator, for example, to a display component executing on the computing device.

As an example, the data for rendering of the graphical sound indicator comprises a graphical user interface (GUI) representation of the graphical sound indicator that is configured to overlay a graphical user interface of the video game (or other executing type of content). In examples where the sound visualization application/service is executing on a computing device that is running the video game (or other type of content), one or more components of the sound visualization application/service are configured to execute processing operations that cause the display component to present the graphical user interface representation, for example, concurrent with and overlaying the GUI of the video game. This may comprise presenting exemplary graphical sound indication in its own graphical user interface layer. One example of said graphical user interface layer comprises presenting a graphical sound indicator through a GUI of the sound visualization application/service that is separate from the GUI of the video game executed by the video game application. For instance, exemplary graphical sound indication is configured to be presented in a manner that transparently overlays a GUI of the video game such that only the graphical sound indication (e.g., one or more graphical sound indicators) are visibly presented in a GUI layer. In some alternative examples, the sound visualization application/service may interface with a gaming application/service, sending commands to present exemplary visual sound indicators through a GUI of a gaming application/service. This may trigger presentation of a graphical sound indicator through the GUI of the gaming application/service such that the graphical sound indicator overlays other content presented for the video game. In either type of example, said processing improves usability and user productivity for a user so as not to obstruct the executing video game and avoid disrupting user gameplay.

Examples of the present disclosure further extend to those in which graphical sound indication generation processing occurs on a device that is connected with one or more output devices (other computing devices) which are being utilized to output audio/visual content of an application/service. Non-limiting examples of this type of operation is that in which a user is executing gaming content on a game console (or other type of computing device) that is connected to a display device (e.g., television for output of video and audio). In such examples, a sound visualization application/service, executing on gaming console, is configured to interface with a device that is outputting a video game. For instance, the sound visualization application/service detects sound data transmitted by the video game to an audio component of an output device that is outputting gaming data (e.g., sound and video for the video game). The sound visualization application/service executes similar processing operations to that described in the foregoing with respect to analyzing the sound data and generation of graphical indication for the sound data. In such technical examples, as the sound visualization application/service is executing on a separate device from that which outputs gaming data, the sound visualization application/service transmits, to a display component executing on the second computing device, data for rendering of the graphical sound indicator. The display component of the output device may then be used to present the graphical sound indicator concurrently with (or within) a GUI of a gaming application/service that is executing the video game. Examples for presentation of graphical sound indication have been described in the foregoing and are similarly applicable in technical examples where an output device is different from a computing device that is executing the sound visualization application/service. For instance, the sound visualization application/service may be configured to generate a GUI representation that comprises a graphical sound indicator in a layer overlaying a GUI representation of the video game. Said data for rendering of the graphical sound indicator comprises the GUI representation that is transmitted to the output device for display.

Exemplary technical advantages provided by processing described in the present disclosure comprise but are not limited to: creation and implementation of a sound visualization application/service that can universally be applied to add improved feature functionality (including generation and rendering of graphical sound indication) to any type of application/service; generation and implementation of graphical sound visualization (e.g., graphical sound indicators) via said sound visualization application/service; ability to generate and render graphical sound visualization without requiring access to code for an application/service that is presenting content, thereby improving processing efficiency (e.g., reduction in processing cycles, saving resources/bandwidth) for computing devices when generating graphical sound indication described herein; reduction in latency when generating graphical sound visualization via processing operations described herein; an improved GUI experience that presents graphical sound visualization concurrently with content of an application/service; interoperability to implement the described technical security scenarios across a plurality of applications/services (e.g., applications/services of a software application platform); and improving usability of applications/services for users, among other technical advantages.

FIG. 1 illustrates an exemplary method 100 related to processing by an exemplary sound visualization application/service as described herein, with which aspects of the present disclosure may be practiced. As an example, method 100 may be executed across an exemplary computing system 401 (or computing systems) as described in the description of FIG. 4. Exemplary components, described in method 100, may be hardware and/or software components, which are programmed to execute processing operations described herein. Operations performed in method 100 may correspond to operations executed by a system and/or service that execute computer programs, software agents, intelligent bots, application programming interfaces (APIs), plugins, neural networks and/or machine-learning processing, among other examples. In some examples, processing operations described in method 100 may be executed by one or more applications/services associated with a web service that has access to a plurality of application/services, devices, knowledge resources, etc. In one instance, processing operations described in method 100 may be implemented by one or more components connected over a distributed network.

Method 100 begins at processing operation 102, where a sound visualization application/service is launched on a computing device. As referenced in the foregoing description, a sound visualization application/service may be implemented as an independent application/service or plugin that works universally to provide graphical sound visualization functionality regardless of whether an application/service, presenting content, was developed to support graphical sound visualization or not. For example, the sound visualization application/service is configured to execute one or more components that execute processing to analyze sound data, generate graphical sound indication and render graphical sound indication for display, as described herein. As such, the sound visualization application/service is configured to provide graphically without requiring access to code of an executing video game (or other type of content).

An exemplary sound visualization application/service may be launched (processing operation 102) on a computing device through any type of processing including but not limited to: a programmed computer module (e.g., executing an application/service); and a software component such as plug-in or application/service, among other examples. In one instance, a sound visualization application/service is integrated within an operating system (OS) of a device that is configured to execute application/services. However, in other examples, the sound visualization application/service is a computer program that interfaces with components of a computing device (locally over a distributed network connection) via an OS. For instance, one or mode sound visualization generation components be components of a sound visualization application/service that is a stand-alone application/service configured to execute processing operations described herein. In other examples, sound visualization generation components are configured to execute as a software plug-in that is operates in conjunction with an executing application/service to extend functionality of said application/service by providing graphical sound visualization and/or accessibility feature functionality. For instance, an exemplary plugin may be configured to interface with an executing application/service through an API.

As indicated above, the sound visualization application/service may generate graphical sound indication for content of an executing application/service. An application/service may be any type of programmed software, Non-limiting examples of applications/services comprise but are not limited to: gaming applications/services; content streaming applications/services; word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/services, directory applications/services, mapping services, calendaring services, electronic payment services, digital data storage or distributed data storage applications/services, web conferencing applications/services, call communication applications/services, language understanding applications/services, bot framework applications/services, networking applications/service, team collaborative applications/services and social networking applications/services, among other examples. In some examples, an exemplary application/service may be integrated into a software application platform providing access to a suite of applications/services. Moreover, specific application/services as well as application platform suites (e.g., software application platform providing correlated access to a plurality of applications/services) may be configured to interface with other non-proprietary application/services (e.g., third-party applications/services) to extend processing described herein. For ease of explanation, processing operations described herein reference with respect to executing content refer to a gaming application/service (e.g., video game application/service) as an exemplary application/service.

In some examples, the sound visualization application/ service is programmed automatically launch (processing operation 102) based on execution of an application/service for which accessibility features may be generated and rendered. For instance, executing of a gaming game application/service may be a trigger for execution of processing operations of the sound visualization application/service. In another instance, the sound visualization application/service may be configured to automatically launch based on detection of gaming data (e.g., sound data and/or video data) transmitted from the video game application/service to a computing device (or component thereof) for output. In yet another example, the sound visualization application/service is launched automatically through an OS when a computing device is executing (e.g., a user logs into an OS of the computing device). In some alternative examples, the sound visualization application/service is executed on a computing device (e.g., server) that is executing remotely from that which is executing a video game on behalf of a client. In such instances, launching (processing operation 102) of the sound visualization application/service may still occur based on access to a gaming application/service, transmission of gaming data for output, login to a client computing device, etc.

Once a sound visualization application/service is launched and executing, the sound visualization application/ service is configured to execute programmed processing operations to universally generate and render graphical sound visualization as described herein. Flow of method 100 may proceed to processing operation 104, where the sound visualization application/service is configured to execute an event listener that is configured to detect sound data transmitted from an exemplary application/service (e.g., a gaming application/service). Implementation of an event listener is known to one skilled in the field of art. Above what is known, an exemplary event listener may be specifically programmed to detect sound data transmitted by the video game to an audio component of the computing device. The listener may raise an event for dynamic generation of a graphical sound indication, for example, when analysis of sound data yields a determination that a threshold has been satisfied for generation of graphical sound indication.

The sound visualization application/service may configure and implement an event listener that is configured to monitor any of: data transmitted from a gaming application/ service and data transmitted to/received at an audio component of a computing device, among other examples. Implementation of an event listener is known to one skilled in the field of art. Above what is known, the sound visualization application/service is configured to tailor implementation of one or more event listeners for the purposes described herein. Gaming data, that may identified by an exemplary event listener (or multiple event listeners) may comprise any and all of: sound data transmitted for output by the audio component; display data transmitted for output by a display component of a computing device; network data associated with execution of a running video game (e.g., communications transmitted during gameplay such as a multiplayer game); and user-specific data (e.g., user identifying data users involved in communications), among other examples.

A video game application/service may transmit sound data to an audio component of the computing device for output by the computing device (or another output device connected with the computing device). In one example, the sound visualization application/service acts as an intermediary component that detects and analyzes the sound data before it is received by an audio component and then relays/loops back the sound data to the audio component for output. This may be one methodology that the sound visualization application/service utilizes to minimize latency between the time it takes to transmit sound data for output and the time the sound data is actually output by an output device. In other examples, the sound visualization application/service is configured to monitor sound data received at the audio component. In any technical example, processing described herein is configured to execute as efficiently as possible and thereby minimize latency when processing data intended for output.

An audio component, as referenced herein, is one or more components associated with a computing device that are configured to process and output audio signals. Non-limiting examples of an audio component comprise but are not limited to: a sound driver of the computing device (e.g., virtual sound driver); a sound card of the computing device; or a combination thereof. As the audio component is a general component of a computing device (e.g., output device), processing operation 104 executes without requiring direct access to code for the video game itself. In some alternative examples where other types of accessibility features are being generated, it is to be understood that the sound visualization application/service can be configured to execute an event listener that detects other types of data (e.g., display data transmitted to a display component, input data transmitted to an input processing component) as a trigger for generation of accessibility features. In any example, sound data may be directed for output to one or more specific channels of an audio component such as (a front speaker; a back speaker; front-left speaker; front-right speaker; rear-left speaker). It is to be understood that an audio output device may be configured with any number of components and be divided into any number of channels to manage accurate audio output. In one example, an exemplary audio component is configured for processing of 3D sound. 3D sound enables virtual placement of sound sources anywhere in three-dimensional space, including behind, above or below the listener. This data may be valuable to helping identify exactly where a sound occurs relative to presented/streaming content.

Flow of method 100 may proceed to processing operation 106, where the sound visualization application/service detects sounds data transmitted to an audio component of a computing device. As referenced above, the transmission of sound data to an audio component may be detected by an event listener executed (processing operation 104) by the sound visualization application/service. Sound data may comprise audio signals transmitted to be output by the audio component, for example, by speakers or another similar audio output component integrated within the computing device or connected with the computing device. Detection and analysis of sound data may initiate based on any of the following triggers: transmission of sound data from a gaming application/service and/or receipt of sound data at an audio component of a computing device (e.g., configured for output of gaming data including sound data), among other examples. In examples where other types of gaming data are being monitored by an event listener (or listeners), processing operation 106 may further comprise detecting transmission of other types of gaming data.

In some examples, flow of method 100 may proceed to processing operation 108, where the sound visualization application/service is configured to filter sound data transmitted by a specific application/service (e.g., gaming application/service) and/or received at an audio component being monitored. As the audio component may be configured to work with raw sound data, filtering (processing operation 108) of the sound data may comprise executing one or more processing operations to sample and analyze a raw audio stream, for example, that is transmitted from the gaming application/service. In one example, the sound visualization application/service may be configured to sample the raw audio data (e.g., create a digital representation of an analog audio signal) in specific audio format to further analysis. For instance, a raw audio stream may be converted into a 16-bit wave format. However, it is to be understood that the present disclosure is intended to work with audio data across any format/size.

Moreover, as the audio component of the computing device may be a general processing component that receives data from a plurality of applications/services for output, filtering processing, executed by the sound visualization application/service, may be further configured to execute processing operations that parse sound data transmitted to the audio component and isolate sound data transmitted by a specific application/service (e.g., gaming application/service executing a video game). In one such example, execution of the event listener may be programmed to detect sound data transmitted to specific channels of an audio component to aid efficiency during analyzing sound data (e.g., raw sound data transmitted for output). A contextual filter may be applied that identifies attributes of specific sound data to identify that sound data is specific to a desired application/service such as a gaming application/service. For instance, filtering (processing operation 108) may comprise applying a contextual filter that is trained to detect and identify attributes of sound data, received at the audio component, to identify that the sound data is specific to an executing video game (or other type of content). Non-limiting examples of attributes comprise but are not limited to: indication of a source of transmission of sound data; indication of a target of transmission of data including any indications of a specific channel for output; indication of a type of sound data being transmitted; and identification of location data for a sound, among other examples.

Continuing the above examples, flow of method 100 may proceed to processing operation 110, where the sound visualization application/service is configured to analyze the sound data transmitted from a gaming application/service. Analysis of the sound data may comprise evaluating either the raw sound data received directly from the gaming application/service or a sampling of the raw audio data in an optimized format (e.g., 16-bit wave format). In doing so, the sound visualization application/service executes an algorithm (or artificial intelligence processing) to evaluate amplitude of the analyzed sound data. Amplitude or an alternative attribute of sound data (e.g., frequency, energy) may be utilized to determine whether a threshold is satisfied for generation of graphical sound indication. With regard to the type of attribute being evaluated (e.g., amplitude, frequency, energy), a threshold value may be set by developers at any value without departing from the spirit of the present disclosure. The threshold value may be utilized to determine if a sound is loud enough to warrant further analysis include generation of graphical sound indication. In one example, a fast Fourier transform (FFT) or the like is used to calculate an average amplitude of the sound data being analyzed. This may be done for any number of channels of the audio component (e.g., each channel of the audio component) to determine if sound transmitted to a specific channel satisfies a threshold for generation of graphical sound indication.

Use of a threshold effectively eliminates most background noise as such background noise is not loud enough to exceed the threshold. This type of processing may help improve efficiency where subsequent analysis of sound data is not performed on every type of sound that occurs as that may slow down processing and create unnecessary latency in cases where a sound may be deemed insignificant to the gameplay of a user. A threshold sound level may be set specific for a type of application/service that is executing or even to a finer level such as to a specific video game that is being executed. For instance, some video games may have varying levels of sound output and/or may be impacted by sound at varying levels. As such, testing may be performed to determine threshold sound levels in different contextual scenarios.

In any example, analysis (processing operation 110) of the sound data may comprise executing processing operations that determine a location of a sound within an executing application/service (e.g., in a running video game). This may occur based on results of the amplitude evaluation of sound data transmitted to channels of the audio component(s). For instance, sound data transmitted to a specific channel (or across multiple channels) may be identified (e.g., left, right, top, bottom), which is utilized to identify how to generate graphical sound indication. An exemplary listener may be configured to generate a listener event that outputs results of the sound data analysis. In one example, a listener event is generated when the analysis of the sound data yields a determination that the sound data satisfied a threshold evaluation (e.g., a threshold sound level is achieved). As indicated in the foregoing examples, this may occur when a metric such as amplitude (e.g., average amplitude of sound data) satisfies the designated threshold. In some alternative examples, a listener event may be created in any instance where sound is detected at a channel of an audio component regardless of whether a threshold is utilized.

An exemplary listener event may provide indication of which channels of an audio component are to output sound, as well as attributes of the sound data including but not limited to: the magnitude of the sound, the length of the sound, whether the sound is occurring simultaneously across multiple channels, whether the sound is repeated across channels, etc. The sound visualization application/service may utilize the data from the listener event to determine how to generate the graphical sound indication. In some examples where a different application/service is utilized to generate a GUI representation that comprises the graphical sound indication, the sound visualization application/service may propagate the data from the listener event so that the GUI representation may be generated.

In some alternative examples, analysis of the sound data (processing operation 110) may utilize a threshold sound level determination to further determine whether to execute additional analysis of the sound data such as classifying said sound data. That is, in some examples, further analysis may be executed to determine whether a more specific graphical sound indication is warranted to classify the type of sound for the user. For example, analysis may be executed to determine whether sound data (i.e., signal data for a sound) exceeds a threshold sound level (e.g., the average amplitude of the sound data of a specific channel exceeds a threshold amplitude metric). In response to detecting that the sound exceeds the threshold sound level, the sound visualization application/service is configured to propagate the sound for application of artificial intelligence processing, which may be utilized to classify the sound data.

Implementation of artificial intelligence processing is known to one skilled in the field of art. Exemplary artificial intelligence processing, which is applicable to aid any type of determinative or predictive processing described herein, may be any of: supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM); and neural networks, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. In any example, the artificial intelligence processing may be configured to apply a ranker to determine a best possible result to output (e.g., for determining a location of a sound or classification of a type of sound) based on ranking/scoring processing. For instance, a highest ranking/scored output (or outputs) of the artificial intelligence processing may be utilized for determining a location of a sound within a video game or a classification for the type of the sound. Ranking/scoring processing is known to one skilled in the field of art.

Above what is known, artificial intelligence processing may be configured to classify a type of the sound. The sound visualization application/service may utilize a classification of the type of sound to generate an icon indication (or other type of graphical sound indication such as labeling) to classify the type of sound for the user in real-time (or near real-time) execution of content (e.g., a running video game). For instance, the sound data may be parsed, where parameters associated with the sound data may be extracted and propagated as inputs to trained artificial intelligence processing to determine a classification for the sound data. The sound visualization application/service, in applying artificial intelligence processing, may leverage a corpus of training data for classification of the sound data. This may comprise but is not limited to: data matching attributes of the sound data to those of a specific classification for the sound data; and data indicating previous patterns of sound signals collected from one or more application/services (e.g., previous patterns of sound data from the same type of video game that is executing), among other examples. Exemplary artificial intelligence processing may further leverage data from other resources of a software application platform to improve accuracy when classifying a type of sound as well as gaming data received from a gaming application/service that may provide contextual indications of what is going on during an executing video game (e.g., footsteps of rival player approaching, explosion, player commentary or game narration). In examples where a classification is made as to the type of sound, the sound visualization application/service may generate a graphical sound indication (e.g., graphical icon and/or graphical labeling) for the sound data based on a classification result from applying the artificial intelligence processing.

Flow of method 100 may proceed to processing operation 112, where results from analysis of the sound data may be utilized to generate graphical sound indication of the sound. Processing operation 112 may further comprise generating data for rendering of a GUI representation that comprises exemplary graphical sound indication. In processing operation 112, the sound visualization application/service is configured to either: 1) generate data for rendering of a GUI representation comprising graphical sound indication that is to be presented through a GUI of the sound visualization application/service; or 2) generate data for modifying a GUI representation that may be presented through a GUI of a gaming application/service that is presenting a GUI of a video game. That is, the sound visualization application/service can be configured to execute in different ways to achieve processing results described herein. In any example, processing operation 112 may utilize results from analysis of the sound data (and/or other types of gaming data) to determine specific graphical sound indication (one or more graphical sound indicators) to display. As an example, a graphical sound indicator may comprise a graphical indication for the location of the sound based on a result of the analyzing of the sound data. For instance, a graphical sound indication may be a directional arc (or the like) that provides a player of a video game with an indication as to which direction a detected sound is coming from. While a directional arc is one example of a graphical sound indicator for a location/direction of a sound, it is to be understood that other types of graphical illustrations can be provided to identify a location and/or classification of the sound data without departing from the spirit of the present disclosure. In some examples, if subsequent analysis is executed on the sound data, additional graphical sound indication may further be generated such as a classification of the sound (e.g., via labeling and/or icon indicating a classification type). Non-limiting visual examples of graphical sound indication is provided in the processing device views shown in FIGS. 3A-3C.

In order to generate a graphical user interface representation, the sound visualization application/service may be configured to evaluate data generated from analysis of the sound data. As an example, the sound visualization application/service may execute a user interface component to generate data for rendering of a GUI representation that comprises graphical sound indication. Alternatively, the sound visualization application/service may interface with a user interface generation component of another application/service to provide data for generation of a GUI representation that comprises graphical sound indication.

In generating a GUI representation, an exemplary user interface component of the sound visualization application/service may subscribe to the listener object generated that is generated from analysis of the sound data. When an event is raised by the listener, the user interface component is configured to utilize data from the listener event to generate a graphical sound indication (e.g. an arc drawn on-screen). The graphical sound indication is configured to illustrate a direction that a sound is intended for output within a GUI of a video game (or other type of displayed content). For instance, a listener event may indicate that a sound is coming from a left portion of a gaming GUI (e.g., left-back channel of an audio component), which may trigger generation of a graphical arc displaying over a left-side of a GUI of video game. In further examples, if analysis of the sound data indicates that a sound is being repeated and/or spread across multiple channels of an audio component, the graphical sound indication may reflect this. In at least one instance, the graphical sound indication is programmed to display for a predetermined amount of time (e.g., for about 200 milliseconds before fading away). In other examples, the graphical sound indication may be presented in a GUI representation for as long the analyzed sound data continues to exceed a threshold (e.g., threshold sound level). In non-limiting examples where the graphical sound indication is displayed as an arc, the arc is continuously drawn to appear on a display. This enables a user/player to see the duration of significant sounds. In other instances, a graphical sound indication may be illustrated to reflect other attributes from analysis of the sound data (e.g., a magnitude of a directional arc illustrated on a display may vary based on a magnitude of the sound data or visual indications are presented when a sound occurs across multiple channels concurrently).

In further examples, other types of analysis may affect representations of graphical sound indication. For instance, gaming data, transmitted by a gaming application/service to one or more components of a computing device, may be analyzed to aid in generation of a GUI representation that comprises graphical sound indication. In one example, gaming data being transmitted to a display component, for output of a GUI of a video game, may be analyzed to identify locational data for display of a GUI of a gaming application/service that is executing a video game. However, it is to be understood that the sound visualization application/service may be configured to analyze data from any components of an executing computing device to determine placement of graphical sound indication. The sound visualization application/service may utilize gaming data to identify a location (positional placement) for output of graphical sound indication, for example, that overlays a GUI of the gaming application/service that is displaying the video game. The sound visualization application/service is configured to utilize this locational data to render a GUI representation through the sound visualization application/service or provide rendering data to the gaming application/service (e.g., through a plugin interfacing with the gaming application/service) that is usable to render a GUI representation.

Moreover, in examples where a classification of the sound data occurs, results from classification of a type of sound may be utilized for rendering of graphical sound indication. Processing results from artificial intelligence processing may be propagated to a user interface component for generation of graphical sound indication that reflects a classification of the sound data. For instance, in addition to display of a directional arc reflecting a location/direction of the sound, additional graphical sound indication may be generated and presented to reflect a classification of sound data. Among other non-limiting examples, one or more of an icon and/or labeling may be provided in a GUI representation to illustrate a classification of the sound data for user.

At processing operation 114, data for rendering graphical sound indication may be transmitted for output. The sound visualization application/service (e.g., a user interface component) transmits data for rendering of the graphical sound indicator, for example, to a display component executing on the computing device or a different computing device that may be configured as an output device. As an example, a display component may be one or more components configured to output visual signal data (e.g., GUIs, images, videos) such as a display driver, a video card, or a combination thereof. The display component is configured to receive said data for rendering from the sound visualization application/service and output a graphical user interface representation that comprises the graphical sound indication, for example, while a GUI of the video game is concurrently running. In one non-limiting example, the data for rendering of the graphical sound indicator comprises a graphical user interface representation of the graphical sound indicator that is configured to overlay a graphical user interface of the video game. Said GUI representation may be presented through a GUI of the sound visualization application/service. In another example, the data for rendering the graphical sound indicator is data to enhance a graphical user interface representation of a gaming application/service, for example, where graphical sound indication may be presented through a GUI of the gaming application/service. In some technical examples, as the sound visualization application/service is configured to interface directly with a display component, the sound visualization application/service may not require direct access to code of a gaming application/service to output exemplary graphical sound indication. In alternative examples, the sound visualization application/service may be configured to transmit data for rendering to a gaming application/service, through a plugin interfacing with the gaming application/service, whereby the gaming application/service may then transmit data for rendering of its GUI to a display component.

Flow of method 100 may proceed to processing operation 116, where graphical sound indication may be rendered and presented through a GUI. In examples where the sound visualization application/service is executing on a computing device that is running the video game, the sound visualization application/service is configured to execute processing operations that cause the display component to present the graphical user interface representation, for example, concurrent with and overlaying the graphical user interface of the video game. This may comprise presenting exemplary graphical sound indication in its own graphical user interface layer. One example of said graphical user interface layer comprises presenting a graphical sound indicator through a GUI of the sound visualization application/service that is separate from the GUI of the video game executed by the video game application. For instance, exemplary graphical sound indication is configured to be presented in a manner that transparently overlays a GUI of the video game such that only the graphical sound indication (e.g., one or more graphical sound indicators) are visibly presented in the GUI layer. In some alternative examples, the sound visualization application/service may interface with a gaming application/service, sending commands to present exemplary visual sound indicators through a GUI of a gaming application/service. This may trigger presentation of a graphical sound indicator through the GUI of the gaming application/service such that the graphical sound indicator overlays other content presented for the video game, for example, when the sound visualization application/service is executing as a plugin that interfaces with a gaming application/service. In either type of example, said processing improves usability and user productivity for a user so as not to obstruct the executing video game and avoid disrupting user gameplay.

Flow of method 100 may proceed to decision operation 118, where it is determined whether a graphical sound indication is to be updated. As indicated in the foregoing description, content such as video games may be dynamically updating, which may result in the sound visualization application/service to dynamically render (or re-render) based on processing of new gaming data. Gaming data that may result in re-rendering of graphical sound indication is not limited to sound data. For example, a visual update to a GUI of a gaming application/service (e.g., where a user's view changes) causing the location of the sound to vary based on the updated user perspective may require the graphical sound indication to be updated. In other examples, receipt of new sound data may result in an update to the graphical sound indication. The sound visualization application/service is configured to continuously listen for new sound data and/or gaming data that may be utilized to render graphical sound indication.

Subsequent processing of sound data and/or other types of gaming data may result in the immediate update of graphical sound indication or replacement of a previously displayed graphical sound indication with new graphical sound indication. In examples where it is determined that the graphical sound indication is not to be updated, flow of decision operation 118 branches NO and processing of method 100 ends. As indicated in the foregoing description, a displayed graphical indication may be presented for a finite time period and may fade from presentation if the graphical sound indication is not updated. In examples where it is determined that the graphical sound indication is to be updated, flow of decision operation 118 branches YES and processing of method 100 returns to processing operation 106, where new sound data and/or other types of gaming data are detected. This may lead to the generation and rendering of new/updated graphical sound indication by way of processing operations described in the foregoing description.

Figure 2:
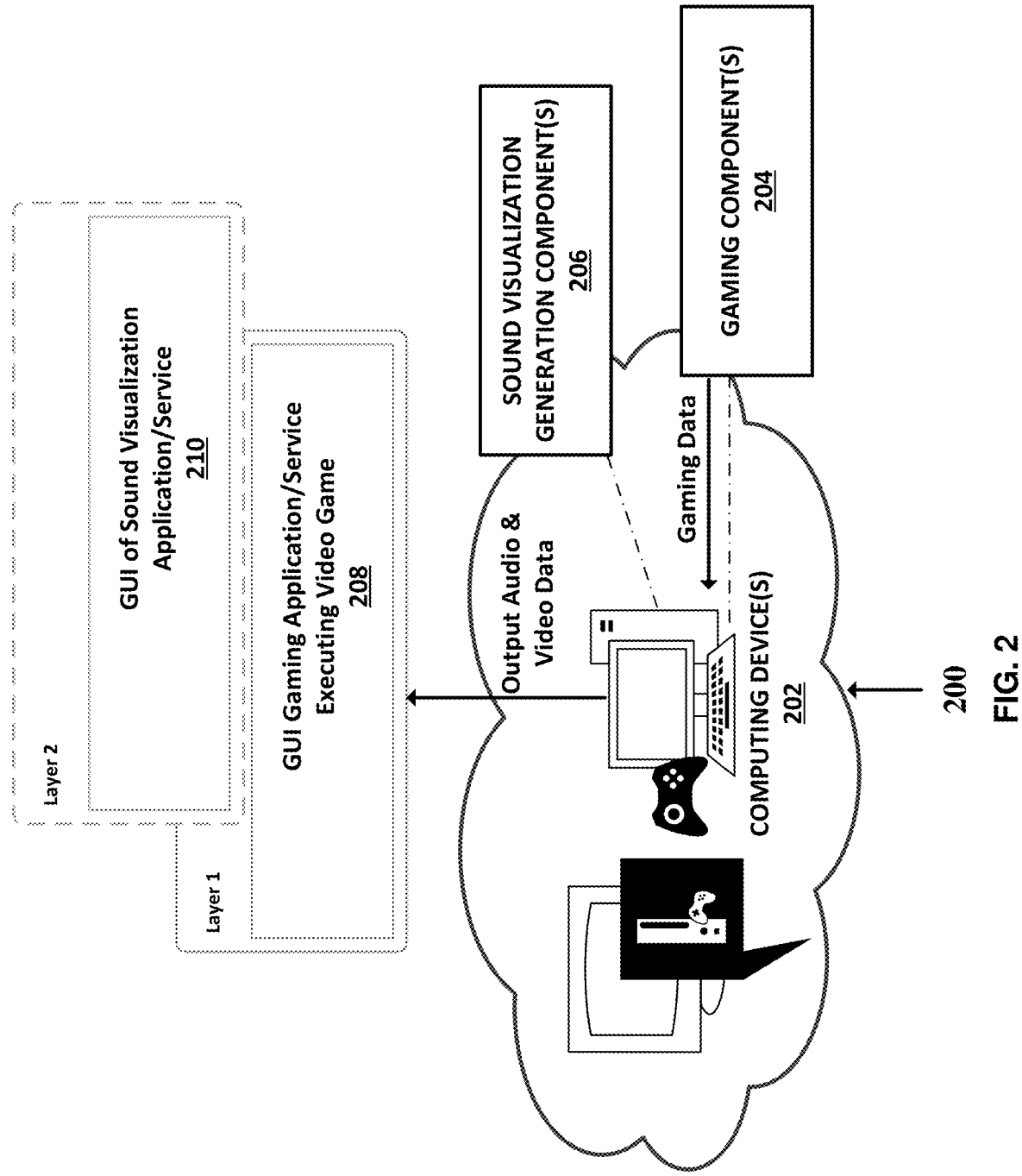
FIG. 2 illustrates an exemplary process flow of an interaction between components that are configured to provide graphical sound visualization during execution of applications/services, with which aspects of the present disclosure may be practiced.

FIG. 2 illustrates an exemplary process flow 200 of an interaction between components that are configured to provide graphical sound visualization during execution of applications/services, with which aspects of the present disclosure may be practiced. Process flow 200 illustrates technical examples where a GUI of a sound visualization application/service overlays a GUI of a gaming application/service to render and present graphical sound indication of sound data associated with an executing video of the gaming application/service. The exemplary GUIs may be presented on a computing device that is executing a gaming application/service or on a computing device configured as an output device that may receive data for rendering and output from another computing device such as a gaming console. As referenced in the foregoing description, the present disclosure further extends to alternative technical examples where processing executed by the sound visualization application/service provides graphical sound visualization for rendering through a GUI of a gaming application/service. However, process flow 200 illustrates technical examples where a GUI of an application/service (e.g., sound visualization application/service) displays graphical sound indication through a GUI that is separate from that of a gaming application/service.

Figure 4:
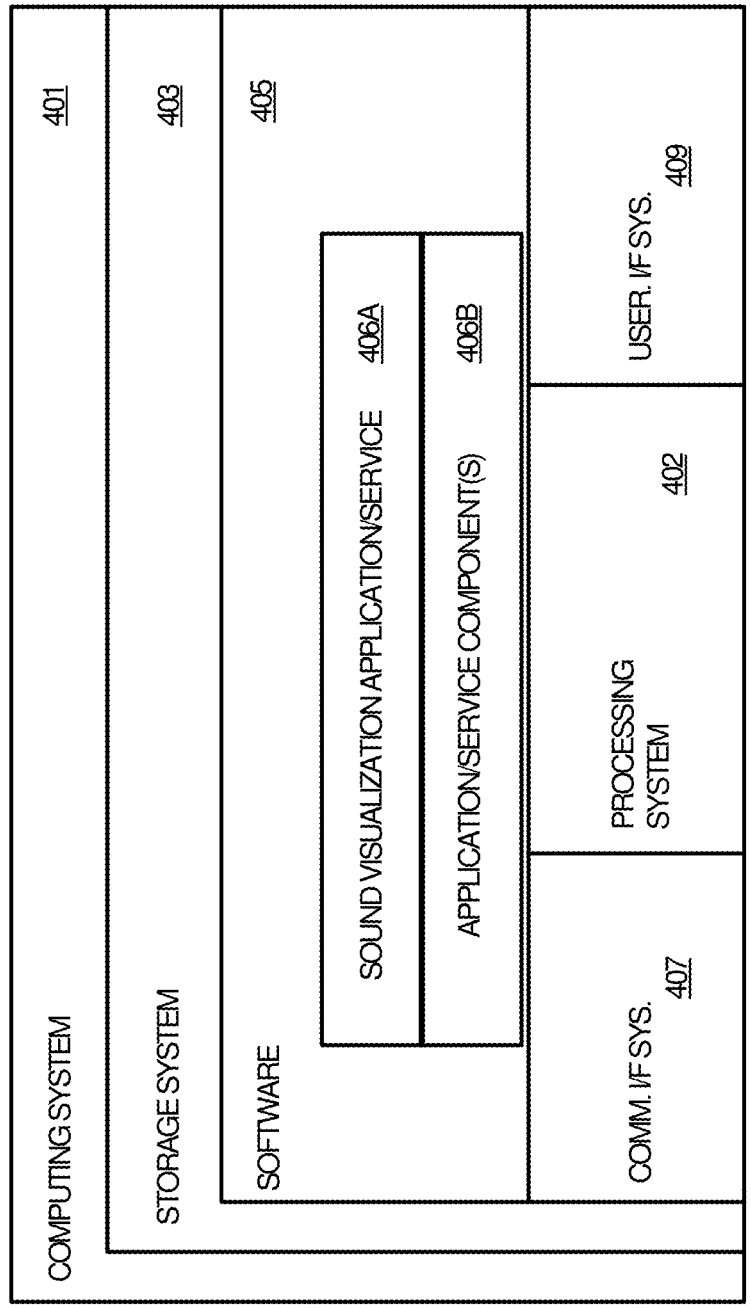
FIG. 4 illustrates a computing system suitable for implementing processing operations described herein related to provision of graphical sound visualization during execution of applications/services as described herein, with which aspects of the present disclosure may be practiced.

As an example, components illustrated in process flow 200 may be executed by an exemplary computing system 401 (or computing systems) as described in the description of FIG. 4. Components described in process flow 200, individually or in combination, may execute processing operations described in the description of method 100 (FIG. 1). Exemplary components, described in process flow 200, may be hardware and/or software components, which are programmed to execute processing operations described herein. In some examples, components of process flow 200 may each be one or more computing devices associated with execution of a specific service. Exemplary services may be managed by a software application platform that also provides, to a component, access to and knowledge of other components that are associated with applications/services. In one instance, processing operations described in process flow 200 may be implemented by one or more components connected over a distributed network.

Process flow 200 comprises: one or more computing devices 202; one or more gaming components 204; one or more sound visualization generation components 206; a GUI of gaming application/service 208; and a GUI of a sound visualization application/service 210. Exemplary components of process flow 200 may be connected via a network connection, where data (including secured data) is transmitted over a network connection as known to one skilled in the field of art. Moreover, process flow 200 between components may be altered without departing from the spirit of the present disclosure. Further, process flow 200 describes components that may be utilized to execute processing operations described in method 100 (FIG. 1) and the accompanying description.

The one or more computing devices 202 may be one or more computing device that are configured for execution of application/services via any of software components, hardware components or a combination thereof. A user may be utilizing the one or more computing devices 202 to play a video game through a gaming application/service (e.g., video game application/service or gaming software platform that enables access to a plurality of video games). In one example, the one or more computing devices 202 of process flow 200 are intended to cover examples where a user is accessing a video game through a gaming console that is connected with another output device that is configured to output gaming data transmitted by the gaming console to the output device for rendering and presentation. In some examples, the gaming console may be connected to one or more other output devices via a wired or wireless connection. An exemplary gaming console may be configured to executed video games stored locally on a hard drive (or via a computer-readable media executing thereon) of the gaming console or may access video game content that via a network connection (e.g., content that is stored and accessed on distributed data storage). In other examples, the one or more computing devices 202 of process flow 200 are also intended to cover examples where a user is executing a video game on a computing device that has integrated components (e.g., display, display component, audio component, processors) for output of gaming data. Again, gaming content such as video games may be run locally via the computing device or accessed over a network connection.

The one or more computing devices 202 may be configured to execute one or more gaming components 204 and one or more sound visualization generation components 206, among other components that are configured to run on said one or more computing devices 202 (e.g., individually or collectively). Sound visualization generation components 206 may be one or more components, executed by an exemplary sound visualization application/service, that are configured to analyze, generate and render graphical sound indication. Other components executing on said one or more computing devices 202 that are not shown in FIG. 2, but are known to be part of the one or more computing devices 202 comprise processing units; audio components; display components; and input components, among other examples, which are described in the description of other figures including (FIGS. 1 and 4).

Exemplary gaming components 204 comprise one or more components (e.g., hardware, software or a combination thereof) that are configured to enable execution of gaming content (e.g., video games, gaming software applications/ platforms, chat/communications). For example, the one or more gaming components 204 transmit gaming data for execution on/across the one or more computing device 202. Non-limiting examples of gaming data have been described in the foregoing description. For instance, the one or more gaming components 204 may transmit gaming data for processing to an audio component, a display component, processing components, etc., to achieve execution of gaming content such as running a video game. For example, the gaming components 204 transmit data that is processed by the one or more computing devices 202 that cause rendering and presentation of a GUI for a gaming application/service 208. A video game may be presented in a GUI layer that is presented through the GUI for the gaming application/service 208.

The one or more sound visualization generation components 206 are executed on the one or more computing devices 202, for example, as part of execution of a sound visualization application/service. An exemplary sound visualization application/service has been described in the foregoing description. Processing operations executed by the one or sound visualization generation components 206 have also been described in the foregoing, including the description of method 100 (FIG. 1). In the example shown in process flow 200, the one or more sound visualization generation components 206 are configured to manage generation and rendering of a GUI executed by the sound visualization application/service 210. The GUI of the sound visualization application/service 210 may provide an additional GUI layer that is presented over the GUI layer presented by the gaming application/service. Process flow 200 illustrates that the GUI layer of the GUI of the sound visualization application/service 210 is transparently overlaid over a GUI layer that is presented by the GUI of the gaming application/service 208. This enables graphical sound indicators to appear as if they were part of the executing video game. Processing for generation and rendering of a GUI representation that overlays another GUI (of the gaming application/service) has been described in the foregoing description.

For instance, gaming data transmitted by the one or more gaming components 204 may be utilized to identify positional/locations coordinates that enable a GUI layer to be generated so that graphical sound indication is presented overlaying another GUI layer. It is to be understood that in some alternative examples, a GUI of the sound visualization application/service 210 may be positioned in a manner that does not overlay a GUI of a gaming application/service. For instance, a GUI layer, presented through the GUI of the sound visualization application/service 210, may be presented next to, above/below, etc., to a concurrently displayed GUI of the gaming application/service 208. In some instances, a placement position of graphical sound indication may be customizable, for example, based on user preferences. A user may prefer accessibility features to be displayed in a specific location to enhance gameplay of a video game. The GUI of the sound visualization application/service 210 may provide user interface features/application command control that allows users to modify settings pertaining to displayed GUI features including graphical sound indicators and representations of the graphical sound indicators.

Figure 3A:
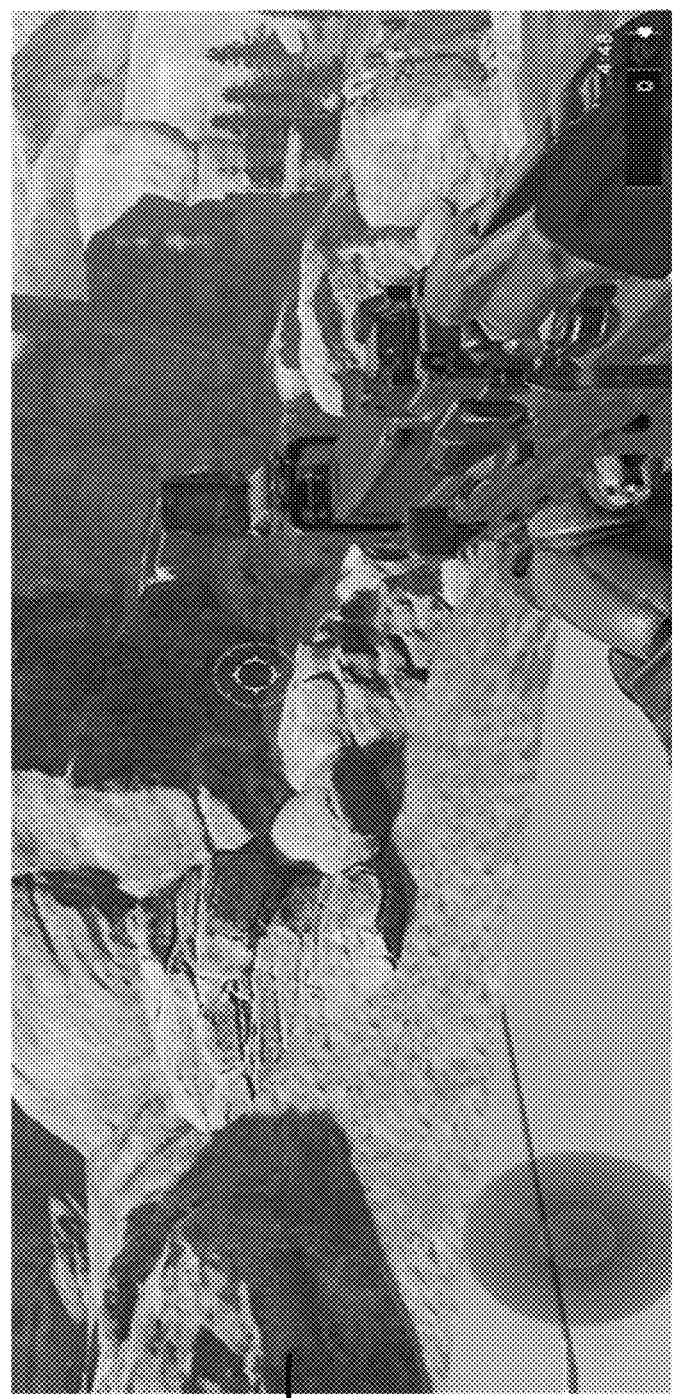
FIGS. 3A-3C illustrates processing device views that provide non-limiting examples of graphical user interface representations highlighting processing results from execution of an exemplary sound visualization application/service, with which aspects of the present disclosure may be practiced.
Figure 3B:
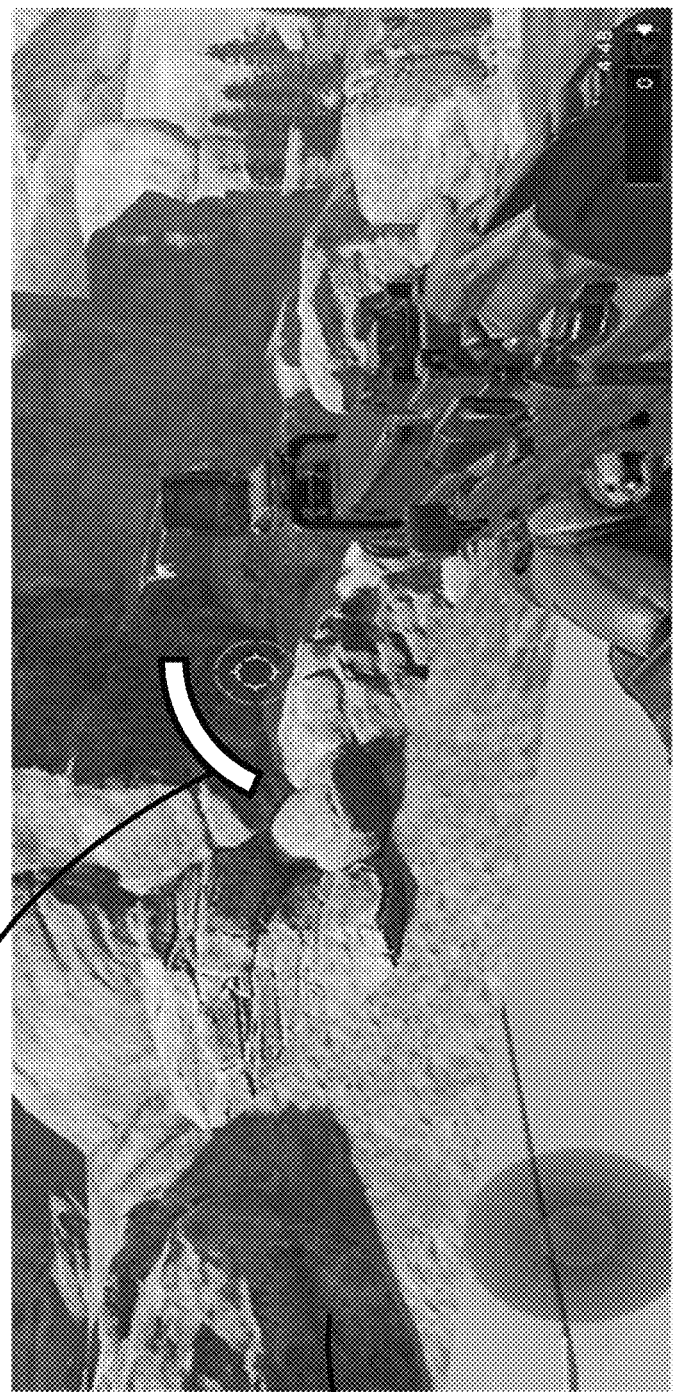
Figure 3C:
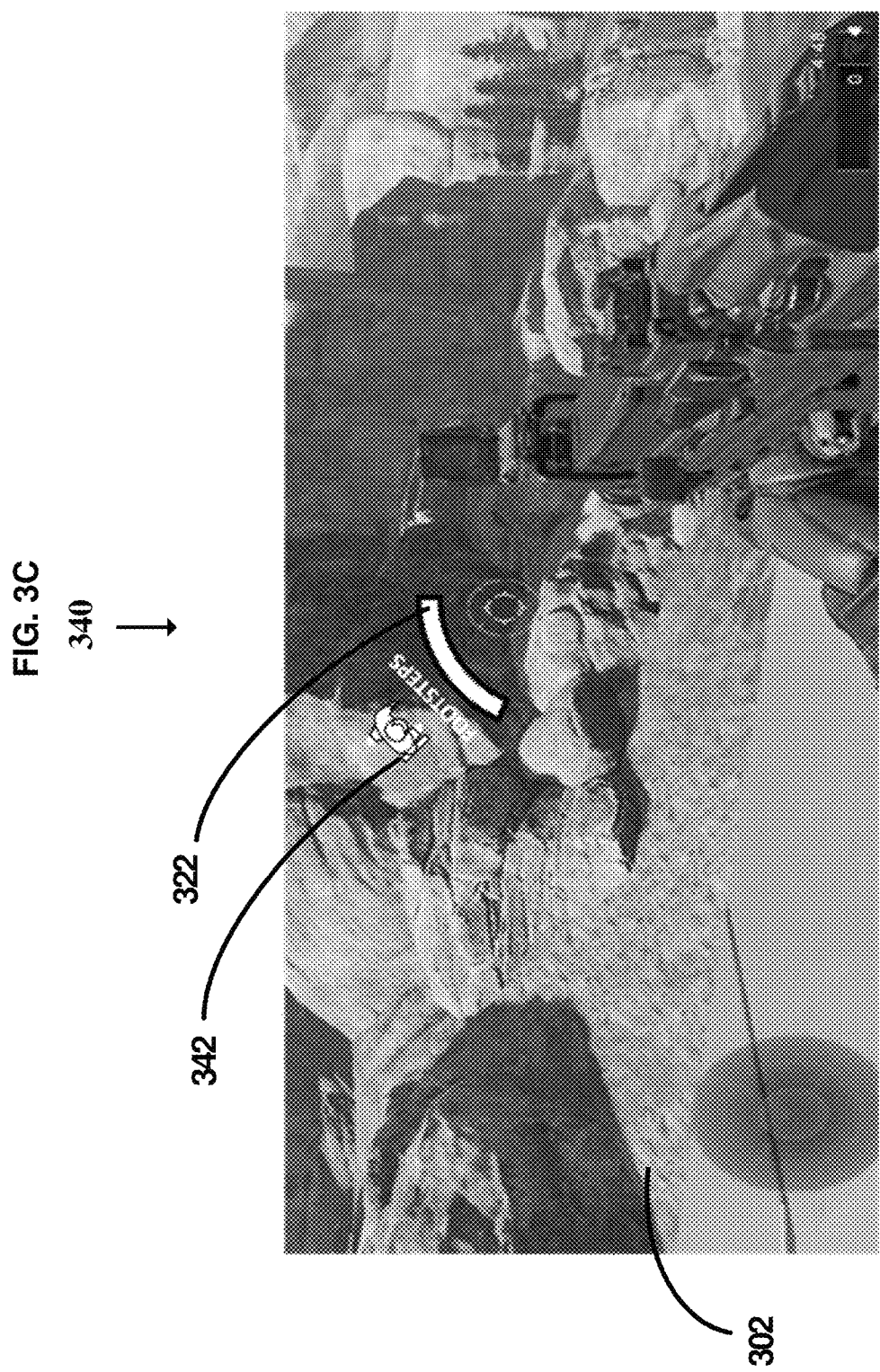

FIGS. 3A-3C illustrates processing device views 300-340, respectively, that provide non-limiting examples of graphical user interface representations highlighting processing results from execution of an exemplary sound visualization application/service, with which aspects of the present disclosure may be practiced. FIGS. 3A-3C provide non-limiting front-end examples of processing described in the foregoing including method 100 (FIG. 1) and process flow 200 (FIG. 2).

FIG. 3A presents processing device view 300, illustrating a GUI representation 302 of a gaming application/service that is presenting a video game. The GUI representation 302 illustrates a video game that is a first-person shooter, where a focus point of a user is the center of the screen.

FIG. 3B presents processing device view 320, illustrating a continued example of GUI representation 302. Processing device view 320 illustrates a non-limiting example of a graphical sound indicator 322 presented to overlay the GUI representation 302 providing the video game. The graphical sound indicator 322 is a graphical arc that is meant to indicate to a user the direction that a sound occurs within the video game. The graphical sound indicator 322 may further be rendered to dynamically reflect attributes of analysis of the sound data. For instance, analysis of sound data may yield a determination that a sound comes from both a left area and a right area relative to a focus point of a user, where analysis of the sound data may yield that the sound is much greater on the left of the focus area as compared with the right. As such, a directional arc (used as the graphical sound indicator 322) maybe presented in a manner that is larger on the left side than the right to emphasize to the user that the sound is greater on the left area than the right. In further examples, analysis of the sound data (e.g., threshold level analysis and/or classification analysis) may yield a determination as to how long (length of time) to present a graphical sound indicator 322 on a display. For instance, a graphical sound indication for an explosion within a video game may be visually displayed longer than a player's footstep.

In the example shown in processing device view 320 (FIG. 3B), the graphical sound indicator 322 is presented to indicate that a sound occurs to the left of a focus point of the user. As indicated in the description of FIG. 3A, a focus point of the user may be the center of the screen, for example, where a GUI element for aiming a weapon of the user (in the first-person shooter) is presented. In it is to be understood that in instances where a sound is detected in a different portion of the GUI of the gaming application/service (or multiple sounds are detected in different portions of the GUI), the graphical sound indicator 322 may be modified to display directional arcs in the respective directions of the sound. It is further noted that a graphical form of the graphical sound indicator 322 may vary without departing from the spirit of the present disclosure. For instance, a sound visualization application/service may be configured to customize graphical sound indicators for different types of content and/or application/services (e.g., graphical sound indication in one video game may be different from that of another). Non-limiting examples for presentation of the graphical sound indicator 322 in a GUI layer have been described in the foregoing description.

FIG. 3C presents processing device view 340, illustrating a continued/alternative example of GUI representation 302. In the example shown in processing device view 340, additional graphical sound indication is presented to provide more context to a user for a detected sound occurring in the video game (presented through the GUI representation 302). For instance, in addition to the graphical sound indicator 322, a second graphical sound indicator 342 may be presented that presents an icon and/or labeling providing a classification for the type of sound detected. In the example shown in processing device view 340, the second graphical sound indicator 342 provides an icon and associated labeling that indicates that footsteps of another player/bot are heard to the left of the focus point of the user.

As indicated in the foregoing description, an exemplary sound visualization application/service is configured to generate the second graphical sound indicator 342 shown in processing device view 340. Processing for determining a classification for a detected sound as well as processing for rendering of an icon/labeling for said graphical sound indication has been described in the foregoing description. It is further to be understood that the second graphical sound indicator 342 may be a preferred type of rendering provided through the sound visualization application/service as opposed to display of a directional arc or other type of representation.

FIG. 4 illustrates a computing system 401 suitable for implementing processing operations described herein related to provision of graphical sound visualization during execution of applications/services as described herein, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be a gaming console utilized to access a video game, which may or may not be accessed via a network connection. In another example, computing system 401 interfaces with a gaming console to enable output of content associated with a video game. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute exemplary method 100 (FIG. 1), process flow 200 (FIG. 2) as well as processing device views similar to those shown in FIGS. 3A-3C.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing an exemplary sound visualization application/service 406a as described herein. Software 405 may further comprise application/service component(s) 406b that provide applications/services as described in the foregoing description such as a gaming application/service. For instance, application/service component(s) 406b may be application/services that present content for which graphical sound visualization is generated and rendered.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of graphical user interfaces for an exemplary sound visualization application/service, a gaming application/service, other interfacing applications/services or any combination thereof. User interface system 409 comprises a graphical user interface that presents graphical user interface elements representative of any point in the processing described in the foregoing description including processing operations described in method 100 (FIG. 1), process flow 200 (FIG. 2) and processing device views shown in FIGS. 3A-3C. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output) in conjunction with operation of exemplary applications/services (e.g., gaming applications/services) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
    launching, on a computing device, a sound visualization application or service that is configured to generate a graphical sound indicator for a video game that is concurrently executing in a video game application or service separate from the sound visualization application or service, wherein the launching causes the sound visualization application or service to execute processing operations that comprise:
        detecting sound data that is transmitted to an audio component of the computing device by the video game application or service executing the video game,
        analyzing the sound data to identify a location of a sound within the video game,
        generating, for presentation in a graphical user interface of the sound visualization application or service that is separate from a graphical user interface of the video game application or service that presents the video game, a graphical sound indicator providing a graphical indication for the location of the sound in the video game based on a result of the analyzing of the sound data, and
        transmitting, to a display component executing on the computing device, data for rendering of the graphical sound indicator in the graphical user interface of the sound visualization application or service.

2. The method of claim 1, wherein the data for rendering of the graphical sound indicator comprises a graphical user interface representation of the graphical sound indicator that is configured to be rendered in the graphical user interface of the sound visualization application or service in a manner that overlays the graphical user interface of the video game application or service, and wherein the method further comprising: presenting, via the display component, the graphical user interface representation concurrent with and overlaying the graphical user interface of the video game application or service.

3. The method of claim 1, wherein the sound visualization application or service is a plugin for the video game application or service that is triggered for execution based on execution of the video game application or service.

4. The method of claim 1, wherein the audio component comprises a sound driver of the computing device that is configured for output of audio signals, through the computing device, that are received from the video game application or service.

5. The method of claim 1, wherein the analyzing of the sound data, to identify the location of the sound within the video game, comprises: converting raw sound data into a wave format; and evaluating an amplitude of the wave format relative to an amplitude threshold specifying a predetermined amplitude that is set for evaluation whether to applying a trained artificial intelligence (AI) model to classify the sound, and wherein the result of the analyzing of the sound data, used to generate the sound the graphical sound indicator, is a determination that the amplitude of the wave format satisfies the amplitude threshold.

6. The method of claim 5, wherein the analyzing of the sound data further comprises: applying the trained AI model adapted to generate a classification of the sound based on the determination that the amplitude of the wave format satisfies the amplitude threshold, and wherein the applying of the trained AI model generates a classification of the sound that is included within the graphical sound indicator.

7. The method of claim 6, wherein the classification of the sound comprises a textual representation identifying the classification that is presented, as part of the graphical sound indicator, in addition to a directional arc providing a visual indication of a direction of the sound.

8. The method of claim 1, wherein the analyzing of the sound data, to identify the location of the sound within the video game, comprises: identifying one or more audio channels of the audio component that sound is intended to be output by and correlating the one or more audio channels with the location of the sound within the video game.

9. A system comprising:
    at least one processor; and
    a memory, operatively connected with the at least one processor, storing computer-executable instructions that, when executed by the at least one processor, causes the at least one processor to execute a method that comprises:
        generating a graphical sound indicator for a video game via a sound visualization application or service that is separate from a video game application or service that displays a graphical user interface of a video game, wherein generating the graphical sound indicator comprises:
            detecting sound data that is transmitted to an audio component of the computing device by the video game application or service that executing the video game,
            analyzing the sound data to identify a location of a sound within the video game,
            generating, for presentation in a graphical user interface of the sound visualization application or service that is separate from a graphical user interface of the video game, a graphical sound indicator providing a graphical indication for the location of the sound in the video game based on a result of the analyzing of the sound data, and
            rendering of the graphical sound indicator in the graphical user interface of the sound visualization application or service.

10. The system of claim system 9, wherein the rendering of the graphical sound indicator comprises rendering a graphical user interface representation of the graphical sound indicator that is configured to be rendered in the graphical user interface of the sound visualization application or service in a manner that overlays the graphical user interface of the video game application or service, and wherein the rendering presents, via the display component, the graphical user interface representation concurrent with and overlaying the graphical user interface of the video game application or service.

11. The system of claim system 9, wherein the sound visualization application or service generates the graphical sound indication, and wherein the sound visualization application or service is a plugin for the video game application or service that is triggered for execution, on the system, based on execution of the video game application or service.

12. The system of claim 9, wherein the analyzing of the sound data, to identify the location of the sound within the video game, comprises: converting raw sound data into a wave format; and evaluating an amplitude of the wave format relative to an amplitude threshold specifying a predetermined amplitude that is set for evaluation whether to applying a trained artificial intelligence (AI) model to classify the sound, and wherein the result of the analyzing of the sound data, used to generate the sound the graphical sound indicator, is a determination that the amplitude of the wave format satisfies the amplitude threshold.

13. The system of claim 12, wherein the analyzing of the sound data further comprises: applying the trained AI model adapted to generate a classification of the sound based on the determination that the amplitude of the wave format satisfies the amplitude threshold, and wherein the applying of the trained AI model generates a classification of the sound that is included within the graphical sound indicator.

14. The system of claim 13, wherein the classification of the sound comprises a textual representation identifying the classification that is presented, as part of the graphical sound indicator, in addition to a directional arc providing a visual indication of a direction of the sound.

15. The system of claim 9, wherein the analyzing of the sound data, to identify the location of the sound within the video game, comprises: identifying one or more audio channels of the audio component that sound is intended to be output by and correlating the one or more audio channels with the location of the sound within the video game.

16. A method comprising:
launching, on a first computing device, a sound visualization application or service that is configured to generate a graphical sound indicator for a video game that is concurrently displayed in a video game application or service, separate from the sound visualization application or service, where the video game application or service is concurrently running on the first computing device, wherein the launching causes the sound visualization application or service to execute processing operations that comprise:
detecting sound data that is transmitted by the video game application or service to an audio component of a second the first computing device,
analyzing the sound data to identify a location of a sound within the video game,
generating, for presentation in a graphical user interface of the sound visualization application or service that is separate from a graphical user interface of the video game application or service that presents the video game, a graphical sound indicator providing a graphical indication for the location of the sound in the video game based on a result of the analyzing of the sound data, and
transmitting, to a display component executing on the second computing device, data for rendering of the graphical sound indicator in the graphical user interface of the sound visualization application or service.

17. The method of claim 16, wherein the analyzing of the sound data, to identify the location of the sound within the video game, comprises: converting raw sound data into a wave format; and evaluating an amplitude of the wave format relative to an amplitude threshold specifying a predetermined amplitude that is set for evaluation whether to applying a trained artificial intelligence (AI) model to classify the sound, and wherein the result of the analyzing of the sound data, used to generate the sound the graphical sound indicator, is a determination that the amplitude of the wave format satisfies the amplitude threshold.

18. The method of claim 17, wherein the analyzing of the sound data further comprises: applying the trained AI model adapted to generate a classification of the sound based on the determination that the amplitude of the wave format satisfies the amplitude threshold, and wherein the applying of the trained AI model generates a classification of the sound that is included within the graphical sound indicator.

19. The method of claim 18, wherein the classification of the sound comprises a textual representation identifying the classification that is presented, as part of the graphical sound indicator, in addition to a directional arc providing a visual indication of a direction of the sound.

20. The method of claim 16, wherein the analyzing of the sound data, to identify the location of the sound within the video game, comprises: identifying one or more audio channels of the audio component that sound is intended to be output by and correlating the one or more audio channels with the location of the sound within the video game.

* * * * *